(12) United States Patent
Xue et al.

(10) Patent No.: US 12,552,973 B2
(45) Date of Patent: Feb. 17, 2026

(54) ADHESIVE COMPOSITION

(71) Applicant: Rohm and Haas Company, Collegeville, PA (US)

(72) Inventors: Yin Xue, Shanghai (CN); Xinhong Wang, Shanghai (CN); Zhenbing Chen, Shanghai (CN); Zhaohui Qu, Shanghai (CN)

(73) Assignee: Rohm and Haas Company, Collegeville, PA (US)

( * ) Notice: Subject to any disclaimer, the term of this patent is extended or adjusted under 35 U.S.C. 154(b) by 883 days.

(21) Appl. No.: 17/754,887

(22) PCT Filed: Nov. 13, 2019

(86) PCT No.: PCT/CN2019/117981
§ 371 (c)(1),
(2) Date: Apr. 14, 2022

(87) PCT Pub. No.: WO2021/092789
PCT Pub. Date: May 20, 2021

(65) Prior Publication Data
US 2024/0093070 A1     Mar. 21, 2024

(51) Int. Cl.
*C09J 133/06* (2006.01)
*C08F 220/18* (2006.01)
*C08F 120/06* (2006.01)
*C08F 212/08* (2006.01)
*C08F 220/06* (2006.01)
*C08F 222/06* (2006.01)

(52) U.S. Cl.
CPC ..... *C09J 133/066* (2013.01); *C08F 220/1804* (2020.02); *C08F 120/06* (2013.01); *C08F 212/08* (2013.01); *C08F 220/06* (2013.01); *C08F 222/06* (2013.01)

(58) Field of Classification Search
CPC .............. C08F 220/06; C08F 222/06; C08F 220/1804; C08F 212/08; C08F 222/02; C08F 220/20; C09F 133/066; C08L 33/064
See application file for complete search history.

(56) References Cited

U.S. PATENT DOCUMENTS

| | | | |
|---|---|---|---|
| 6,071,994 A | 6/2000 | Hummerich et al. | |
| 6,221,973 B1 | 4/2001 | Arkens et al. | |
| 7,199,179 B2 | 4/2007 | Clamen et al. | |
| 7,851,542 B2 | 12/2010 | Michl et al. | |
| 8,604,122 B2 | 12/2013 | Kelly | |
| 9,068,070 B2 | 6/2015 | Braun et al. | |
| 2005/0048212 A1* | 3/2005 | Clamen ............... | D06M 15/263 427/384 |
| 2005/0075444 A1 | 4/2005 | Tosaki et al. | |
| 2006/0024263 A1 | 2/2006 | Van Es et al. | |
| 2008/0214716 A1 | 9/2008 | Weiss et al. | |
| 2012/0172477 A1 | 7/2012 | Huang et al. | |
| 2012/0208001 A1 | 8/2012 | Michl et al. | |
| 2012/0289648 A1 | 11/2012 | Spyrou et al. | |
| 2016/0333155 A1 | 11/2016 | Bai et al. | |
| 2017/0088758 A1 | 3/2017 | Bzowej et al. | |

FOREIGN PATENT DOCUMENTS

| | | |
|---|---|---|
| CN | 103601867 A | 2/2014 |
| CN | 104031225 A | 9/2014 |
| EP | 0565891 A1 | 10/1993 |
| EP | 0583086 A1 | 2/1994 |
| EP | 0913443 A1 | 10/1999 |
| JP | 2006016516 A * | 1/2006 |
| RU | 2208026 C2 | 7/2003 |
| WO | 2004029172 A1 | 4/2004 |
| WO | 2011069746 A1 | 6/2011 |
| WO | 2018/205221 A1 | 11/2018 |
| WO | 2019/151194 A1 | 8/2019 |

OTHER PUBLICATIONS

PCT/CN2019/117981, International Search Report and Written Opinion with a mailing date of Aug. 13, 2020.
PCT/CN2019/117981, International Preliminary Report on Patentability with a mailing date of May 17, 2022.

* cited by examiner

*Primary Examiner* — Eli D. Strah
(74) *Attorney, Agent, or Firm* — Boyle Fredrickson S.C.

(57) ABSTRACT

An adhesive composition is provided. The adhesive composition comprises the following components: (a) a polyacid polymer aqueous dispersion, wherein the polyacid polymer contains 50%~100% by weight of one or more ethylenically unsaturated mono- or dicarboxylic acid/anhydrides; (b) a hydroxyl group-containing acrylic copolymer emulsion, wherein the hydroxyl group-containing acrylic copolymer is obtained from polymerizing a monomer mixture which contains 0.1-10% hydroxyl group-containing monomer, 0.1% to 20% weight unsaturated carboxylic acid and 30%-90% acrylic monomer, wherein the solid weight ratio of the above components (a) and (b) is 0.1:100 to 10:100, based on the solids of the components (a) and (b).

18 Claims, No Drawings

ADHESIVE COMPOSITION

FIELD OF THE INVENTION

The present disclosure relates to an adhesive composition, in particular to an adhesive composition comprising a polyacid polymer aqueous dispersion and an acrylic emulsion.

BACKGROUND

Traditional binders used in textile and nonwoven applications contain N-Methylolacrylamide (NMA) as functional monomer, which provides the binders excellent water resistance (wet strength) and solvent resistance (isopropyl alcohol strength). However, NMA-containing binders release formaldehyde upon heating.

Recently, there is a lot of research work on formaldehyde free crosslinking technologies. These crosslinking technologies achieved good water and solvent resistance after cured, but still are not competitive to the NMA-containing binder.

It is expected to develop a novel formulation with moderate curing temperature to achieve better performances.

SUMMARY OF THE INVENTION

The present disclosure provides an adhesive composition, in particular, free of NMA monomer, with moderate curing temperature to achieve better performances.

In a first aspect of the present disclosure, the present disclosure provides an adhesive composition, comprising the following components:
  (a) a polyacid polymer aqueous dispersion, wherein the polyacid polymer contains 50%~100% by weight of one or more ethylenically unsaturated mono- or dicarboxylic acid/anhydride;
  (b) a hydroxyl group-containing acrylic copolymer emulsion, wherein the hydroxyl group-containing acrylic copolymer is obtained from polymerizing a monomer mixture which contains 0.1-10% hydroxyl group-containing monomer, 0.1% to 20% weight unsaturated carboxylic acid and 30%-90% acrylic monomer,
  wherein the solid weight ratio of the above components (a) and (b) is 0.1:100 to 10:100, based on the solids of the components (a) and (b).

In a second aspect of the present disclosure, the present disclosure provides an article prepared by the adhesive composition according to the present disclosure.

In a third aspect of the present disclosure, the present disclosure provides usage of the adhesive composition of the present disclosure for textile/nonwoven fabrics.

In the present disclosure, a polyacid polymer aqueous dispersion is introduced in a hydroxyl group-containing acrylic binder system, which can be cured to be a network and bring excellent performance. At 150° C., the self-crosslinking system showed excellent wet strength and IPA strength. The formulation according to the present disclosure shows very good storage stability. After acceleration heat aging in 50° C. oven for 30 days, the performance did not decrease. So the formulation according to the present disclosure could be one-component formulation and easy to be handled.

It is to be understood that both the foregoing general description and the following detailed description are exemplary and explanatory only and are not restrictive of the invention, as claimed.

DETAILED DESCRIPTION OF THE INVENTION

Unless defined otherwise, all technical and scientific terms used herein have the same meaning as commonly understood by one of ordinary skill in the art to which the invention belongs. Also, all publications, patent applications, patents, and other references mentioned herein are incorporated by reference.

As disclosed herein, "and/or" means "and, or as an alternative". All ranges include endpoints unless otherwise indicated.

As disclosed herein, the term "composition", "formulation" or "mixture" refers to a physical blend of different components, which is obtained by mixing simply different components by a physical means.

As disclosed herein, the term "glass transition temperature" or "Tg" is determined by differential scanning calorimetry (DSC).

As disclosed herein, all percentages mentioned herein are by weight, and temperatures in ° C., unless specified otherwise.

As disclosed herein, the term "alkyl" or "alkoxy" refers to an alkyl or alkoxy having 1 to 20 carbon atoms, preferably 1-10 carbon atoms, more preferably, 1-8 carbon atoms.

As used herein, the term "(meth)acrylate" refers to acrylate or methacrylate.

As used herein, the term "styrene monomer" means an ethylenically unsaturated monomer substituted with an aromatic group, preferably styrene (Sty) and substituted styrenes, e.g., α-methylstyrene (AMS).

As used herein, the term "solution" refers to a dispersion of a water-soluble polymer which may be prepared by conventional polymerization techniques such as, for example, by solution polymerization.

As used herein, the term "emulsion", "latex" or "latex composition" refers to a dispersion of a water-insoluble polymer which may be prepared by conventional polymerization techniques such as, for example, by emulsion polymerization.

In a first aspect of the present disclosure, the present disclosure provides an adhesive composition, comprising the following components:
  (a) a polyacid polymer aqueous dispersion, wherein the polyacid polymer contains 50%~100% by weight of one or more ethylenically unsaturated mono- or dicarboxylic acid/anhydrides;
  (b) a hydroxyl group-containing acrylic copolymer emulsion, wherein the hydroxyl group-containing acrylic copolymer is obtained from polymerizing a monomer mixture which contains 0.1-10% hydroxyl group-containing monomer, 0.1% to 20% weight unsaturated carboxylic acid and 30%-90% acrylic monomer,
  wherein the solid weight ratio of the above components (a) and (b) is 0.1:100 to 10:100, based on the solids of the components (a) and (b).

The adhesive composition is aqueous, and is preferably solvent free, that is, the adhesive composition comprises less than 4%, preferably less than 2%, and more preferably less than 1%, by dry weight based on total dry weight of the adhesive composition, an organic solvent.

The Polyacid Polymer Aqueous Dispersion

The polyacid polymer contains 50%-100%, preferably 60%-100%, more preferably 70%-100%, most preferably 80%-100%, by weight of one or more ethylenically unsaturated mono- or dicarboxylic acid/anhydrides. Suitable ethylenically unsaturated mono- or dicarboxylic acid/anhydrides include, for example, ethylenically unsaturated carboxylic acid monomers such as, for example, methacrylic acid, acrylic acid, crotonic acid, fumaric acid, maleic acid, 2-methyl maleic acid, itaconic acid, 2-methyl itaconic acid, α,β-methylene glutaric acid, monoalkyl maleates, and monoalkyl fumarates; ethylenically unsaturated anhydrides such as, for example, maleic anhydride, itaconic anhydride, acrylic anhydride, and methacrylic anhydride; and salts thereof. In a preferred embodiment of the present disclosure, the carboxy monomer may be acrylic acid or methacrylic acid or itaconic acid/anhydride or maleic acid/anhydride.

The one or more ethylenically unsaturated mono- or dicarboxylic acid/anhydrides may be copolymerized with any suitable monomer. In one embodiment of the present disclosure, the one or more ethylenically unsaturated mono- or dicarboxylic acid/anhydrides are copolymerized with at least one ethylynically unsaturated monomer, such as an acrylic ester monomer. Suitable acrylic ester monomers include, for example, methyl acrylate, ethyl acrylate, butyl acrylate, 2-ethylhexyl acrylate, decyl acrylate, methyl methacrylate, butyl methacrylate, isodecyl methacrylate, hydroxyethyl acrylate, hydroxyethyl methacrylate, and hydroxypropyl methacrylate; (meth)acrylamide or substituted (meth)acrylamides; styrene or substituted styrenes; butadiene; vinyl acetate or other vinyl esters; acrylonitrile or methacrylonitrile; and the like.

The polyacid polymer contains 0%-50%, preferably 0%-40%, more preferably 0%-30%, most preferably 0%-20%, by weight of at least one ethylynically unsaturated monomer.

The polyacid polymer aqueous dispersion has a total weight solids of no less than 40% preferably from 40% to 60%, more preferably from 45% to 55%.

In one embodiment, the polyacid polymer has a weight average molecular weight of from 2,000 to 1,000,000, preferably from 5,000 to 750,000, and most preferably from 10,000 to 600,000.

The polyacid polymer aqueous dispersion may be made by any conventional solution polymerization, which solution processes are well known by those of ordinary skill in the art.

During the solution polymerization process, chain transfer agents such as mercaptans, polymercaptans, and halogen compounds may be used in the polymerization mixture in order to moderate the molecular weight of the polyacid polymer. Generally, from 0% to 10% by weight, based on the weight of the polyacid polymer, of $C_4$-$C_{20}$ alkyl mercaptans, mercaptopropionic acid, or esters of mercaptopropionic acid, can be used.

The Hydroxyl Group-Containing Acrylic Copolymer Emulsion

The hydroxyl group-containing acrylic copolymer emulsion is a latex, which is a water-based dispersion of particles of a polymer of ethylenically unsaturated monomers. The hydroxyl group-containing acrylic copolymer is obtained from polymerizing a monomer mixture which contains 0.1-10% hydroxyl group-containing monomer, 0.1% to 20% weight unsaturated carboxylic acid and 30%-90% acrylic monomer. The latex will typically exhibit a viscosity ranging from about 10 to 1000 cps at 25° C. and more preferably from 20 to 500 cps 25° C. The solids content in the latex may range from 5 to 95%. More preferably it ranges from 20 to 80%, still more preferably from 30 to 70%, and even still more preferably it ranges from 40 to 60%. In one embodiment, the polymer of the latex has a weight average molecular weight of between 5000 and 2,000,000 and more preferably between 100,000 and 2,000,000.

In one embodiment, the suitable examples of hydroxyl group-containing monomer include, not limited to, a hydroxyalkyl (meth)acrylate, preferably a $C_2$-$C_8$ hydroxyalkyl (meth)acrylate, preferably a $C_2$-$C_4$ hydroxyalkyl (meth)acrylate, preferably a $C_2$-$C_3$ hydroxyalkyl (meth) acrylate. In a further embodiment, the hydroxyl group-containing monomer comprises hydroxyethyl methacrylate (HEMA), hydroxyethyl acrylate (HEA), hydroxypropyl methacrylate (HPMA) and hydroxypropyl acrylate.

The monomer mixture comprises 0.1-10%, preferably 0.5-8%, more preferably 0.5-5%, most preferably 0.5-2%, of hydroxyl group-containing monomer, based on the weight of monomer mixture.

In one embodiment, the unsaturated carboxylic acid comprises one or more α,β-ethylenically unsaturated carboxylic acids. The suitable examples of α,β-ethylenically unsaturated carboxylic acids include, not limited to, an acid-bearing monomer such as (meth)acrylic acid, itaconic acid, or fumaric acid; or a monomer bearing an acid-forming group which yields or is subsequently convertible to, such an acid group (such as anhydride, (meth)acrylic anhydride, or maleic anhydride); or mixtures thereof.

The monomer mixture comprises 0.1-20%, preferably 1-15%, more preferably 1.5-10%, most preferably 1.5-8%, of unsaturated carboxylic acid, based on the weight of monomer mixture.

In one embodiment, the suitable examples of acrylic monomer include, but are not limited to, (meth)acrylates, such as alkyl (meth)acrylates. Examples of alkyl (meth) acrylates are, but not limited to, methyl acrylate, ethyl acrylate, butyl acrylate, glycidyl methacrylate, 2-ethylhexyl acrylate, methyl methacrylate, ethyl methacrylate, butyl methacrylate, and 2-ethylhexyl methacrylate, and combinations thereof.

The monomer mixture comprises 30-90%, preferably 35-85%, more preferably 40-85%, most preferably 45-85%, of acrylic monomer, based on the weight of monomer mixture.

The monomer mixture may further comprise one or more additional monomers, such as styrene monomer and vinyl monomer. The examples of the styrene monomers may include, for example, styrene, substituted styrene, or mixtures thereof. The substituted styrene may include, for example, benzyl acrylate, 2-phenoxyethyl acrylate, butyl styrene, methylstyrene, p-methoxystyrene, or mixtures thereof. Preferred styrene monomer is styrene. The examples of the vinyl monomer may include, for example, olefin such as ethylene, propylene and butadiene; vinyl ester, such as vinyl acetate; vinyl alcohol; acrylonitrile; halogenated alkenes such as vinyl chloride; and mixtures thereof.

The monomer mixture may comprise, by weight of the monomer mixture, 5% or more, 10% or more, 13% or more, and at the same time, 60% or less, 50% or less, of the styrene monomer(s).

It will be appreciated that surfactants may be employed as desired in the bonding agent composition of the disclosure (e.g., for use in emulsion or dispersion polymerization) to provide stability, as well as to control particle size. Conventional surfactants include anionic or nonionic emulsifiers or their combination. Typical anionic emulsifiers include, but are not limited to alkali or ammonium alkyl sulfates, alkali or ammonium alkylether sulfates, alkali or ammonium alkylarylether sulfates, alkyl sulfonates, salts of fatty acids, esters of sulfosuccinic acid salts, alkyl diphenylether disulfonates, and salts or free acids of complex organic phosphate esters. Typical nonionic emulsifiers include, but are not limited to polyethers, e.g. ethylene oxide and propylene oxide condensates which include straight and branched chain alkyl and alkylaryl polyethylene glycol and polypropylene glycol ethers and thioethers, alkyl phenoxypoly (ethyleneoxy) ethanols having alkyl groups containing from about 7 to about 18 carbon atoms and having from about 4 to about 100 ethyleneoxy units, and polyoxyalkylene derivatives of hexitol, including sorbitans, sorbides, mannitans, and mannides. Surfactants may be employed in the polymer compositions of the present invention at levels of 0.1 to 3 wt. % or greater, based on the total weight of the final composition.

The acrylic emulsion has a Tg of −80° C. to 100° C., preferably −50° C. to 80° C., more preferably −45° C. to 60° C., most preferably −40° C. to 50° C.

The solid weight ratio of the polyacid polymer aqueous dispersion and hydroxyl group-containing acrylic copolymer emulsion is 0.1:100 to 10:100, preferably 0.5:100 to 8:100, more preferably 1:100 to 8:100, most preferably 2:100 to 7:100, based on the solids of the polyacid polymer aqueous dispersion and hydroxyl group-containing acrylic copolymer emulsion.

Other optional components of the adhesive composition of the present disclosure include, but are not limited to, agents selected from co-solvents, coalescing agents, pigments or other colorants, fillers, reinforcement (e.g., fibers), dispersants, wetting agents, waxes, catalysts, blowing agents, anti-foam agent, UV absorbers, flame retardants, adhesion promoters, antioxidants, biocides, coalescing agents, or stabilizers. These optional components (as desired) may be added in any order of addition that does not cause an incompatibility between components. Components that do not dissolve in the aqueous carrier (such as pigments and fillers) can be dispersed in the latex or an aqueous carrier or co-solvent using a mixer (optionally a high shear mixer). The pH of the composition can be adjusted by adding acid or base, with agitation. Examples of base include, but are not limited to ammonia, diethylamine, triethylamine, dimethylethanolamine, triethanolamine, sodium hydroxide, potassium hydroxide, and sodium acetate. Examples of acids include, but are not limited to, acetic acid, formic acid, hydrochloric acid, nitric acid, and toluene sulfonic acid.

The adhesive composition of the present disclosure may be used for any purpose. A preferred use is as a binder for textile/nonwoven fabrics. For example, a collection of individual fibers (i.e., fibers that have not been spun into thread) may be brought into contact with the composition of the present disclosure, for example by dipping, metering, spraying, or other methods; the water in the composition of the present disclosure is evaporated or allowed to evaporate, to create a textile/nonwoven mat. The resulting textile/nonwoven mat may or may not be heated (i.e., exposed to temperature above 40° C.), either before or during evaporation of the water. It is contemplated that a continuous volume of polymer will adhere to more than one fiber, and so the polymer will act to bind fibers together.

One measure of the effectiveness of a binder is the tensile strength of the textile/nonwoven mat, especially when the mat has been exposed to water or organic solvent. Higher tensile strength is desirable.

Fibers that are bound together by the composition of the present disclosure may be made of any material. Fibers may be mineral fibers or organic fibers. Organic fibers may be natural or artificial. Some suitable natural organic fibers are made of, for example, cellulose, a cellulose derivative, cotton, linen, and wool. Some suitable artificial organic fibers are made of, for example, rayon, nylon, polyester, acrylic polymer, and polyolefin. In the practice of the present invention, fibers may be mixtures of suitable fibers.

In a second aspect of the present disclosure, the present disclosure provides an article prepared by the adhesive composition according to the present disclosure.

In a third aspect of the present disclosure, the present disclosure provides usage of the adhesive composition of the present disclosure for textile/nonwoven fabrics.

In one embodiment, the adhesive composition of the present disclosure may be used to increase the tensile strength of the nonwoven mat, especially when the mat has been exposed to water or organic solvent.

EXAMPLES

Some embodiments of the invention will now be described in the following Examples, wherein all parts and percentages are by weight unless otherwise specified. However, the scope of the present disclosure is not, of course, limited to the formulations set forth in these examples. Rather, the Examples are merely inventive of the disclosure.

Raw Material:

Abbreviations used: DI water=deionized water; CD=Cross-machine direction; SC=Solids content; BA=Butyl acrylate; Sty=Styrene; IA=Itaconic acid; AA=Acrylic acid; HEMA=Hydroxyethyl Methacrylate; MA=Maleic Anhydride A: polyacid polymer aqueous dispersion (Ready-to-use commercial products, from DOW Chemical):
A1: Acusol 479N, AA/MA copolymer, 40% of solids;
A2: Acusol 505N, AA/MA copolymer, 35% of solids;
A3: Acusol 465, AA/MA copolymer, 40% of solids
A4: Leukotan 8090, AA homopolymer, 40% of solids
DS-4: RHODACAL DS-4, surfactant, from Solvay Chemical;
IA: Itaconic acid, from Sinopharm Chemical Reagent;
HEMA: Hydroxyl ethyl methacrylate, from Tokyo Chemical Industry;
AA: Acrylic acid, from Sinopharm Chemical Reagent;
BA: Butyl acrylate, from Sinopharm Chemical Reagent;
Sty: Styrene, from Sinopharm Chemical Reagent;
APS: Ammonia persulfate, from Sinopharm Chemical Reagent;
SBS: Sodium bisulfite, from Sinopharm Chemical Reagent;
t-BHP: tert-butyl hydroperoxide, 70% water solution, from Tokyo Chemical Industry;
FF6: Bruggolite FF6, from Brüggmann Chemical;
TRITON X-100: surfactant from DOW Chemical.
IPA=Isopropanol, from Sinopharm Chemical Reagent.
WHATMAN #4 paper: a product of Whatman Ltd.

Example 1: Preparation of Hydroxyl Group Containing Acrylic Copolymer Emulsion (B) B-I-1

5.77 g DS-4 was dissolved in 475 g deionized water (DI water). An emulsified monomer mixture was prepared by adding the following raw materials slowly to the solution: 6.84 g IA, 13.7 g HEMA, 34.2 g AA, 1107.4 g BA, 177.7 g Sty, with agitating.

A solution containing 50.42 g DS-4 and 370 g deionized water was fed into a 5-necked, 3 liter round bottom flask equipped with a thermocouple, a cooling condenser and an agitator, and heated to 70° C. under nitrogen. 27.4 g itaconic acid (IA) in 255 g 60° C. DI water was charged into the flask. Then 82.8 g emulsified monomer mixture was charged into the flask. Then 3.72 g ammonia persulfate (APS) in 25 g DI water, and 1.86 g sodium bisulfite (SBS) in 20 g DI water were charged into the flask. When the exothermic peak occurred and temperature was at 70° C., rest emulsified monomer mixture, a solution of APS (2.48 g in 50 g DI water) and a solution of SBS (1.24 g in 50 g DI water) were fed in 120 minutes. The polymerization reaction temperature was maintained at 69-71° C. After completing the addition, the vessel that contained the emulsified monomer mixture and the feeding pipes connecting to the flask were rinsed with 90 g DI water, and the rinse was added back to the flask. Then the flask was held at 70° C. for 15 minutes. Then, a solution of t-BHP (70%, 1.05 g in 5 g DI water) and FF6 (0.9 g) in 5 g DI water was charged. After 15 minutes, a solution of t-BHP (70%, 3.98 g in 38 g DI water) and FF6 (3.38 g in 42 g DI water) was added gradually over 60 minutes, and then the reaction was cooled to room temperature. 15 g ammonia solution was added to adjust the pH value to 6.5-7.5. The solid content is 45%.

The emulsion B-I-1 comprising a copolymer including 81% BA, 13% Sty, 2.5% AA, 2.5% IA, 1% HEMA, by weight based on the dry weight of the copolymer, was prepared. Tg=−25° C.

B-I-2: The emulsion B-I-2 was prepared according the same process with the emulsion B-I-1, except that 5.77 g DS-4 was dissolved in 475 g deionized water (DI water), and an emulsified monomer mixture was prepared by adding the following raw materials slowly to the solution: 6.84 g IA, 34.2 g AA, 615.2 g butyl acrylate, 670 g styrene, with agitating. Tg=30° C.

B-I-3: The emulsion B-I-3 was prepared according the same process with the emulsion B-I-1, except that 5.77 g DS-4 was dissolved in 475 g deionized water (DI water), and an emulsified monomer mixture was prepared by adding the following raw materials slowly to the solution: 6.84 g IA, 34.2 g AA, 806.6 g butyl acrylate, 478.5 g styrene, with agitating. Tg=0° C.

B-C-1: the emulsion B-C-1 was prepared according the same process with the emulsion B-I-1, except that 5.77 g DS-4 was dissolved in 475 g deionized water (DI water), and an emulsified monomer mixture was prepared by adding the following raw materials slowly to the solution: 6.84 g IA, 34.2 g glacial acrylic acid, 1107.4 g butyl acrylate, 191.4 g styrene, with agitating. HEMA was not added. Tg=−25° C.

B-C-2: the emulsion B-C-2 was Ready-to-use Commercial Product (ECONEXT 919, from DOW Chemical), Tg=−25, without HEMA Inventive Examples and Comparative Examples Above raw materials were formulated according to Table 1 below. The raw materials were agitated for 15 mins to obtain a curable aqueous composition.

A piece of WHATMAN paper 28 cm×46 cm was dipped into 300 mL formulated composition. The treated paper was padded by Mathis padder and then dried and cured at 150° C. for 3 minutes. The add-on of the polymer on the paper was controlled between 14-16%. The cured paper was cut into pieces of 1 inch×4 inch, wherein the 4 inch direction is the cross-machine (CD) direction of the paper. The tensile strength of sample was tested under the treatment of dry (untreated), wet (after 30 minutes immersion in 0.1% Triton X-100/water solution) and IPA (after 30 minutes immersion in isopropanol) on Instron tensile tester. The wet strength reflects the resistance to water, and the IPA strength reflects the resistance to solvent. The result were shown in Table 2 below.

TABLE 1

Formulation of Samples.

| | A1 (40%) | A2 (35%) | A3 (40%) | A4 (40%) | B-I-1 (46%) | B-I-2 (46%) | B-I-3 (46%) | B-C-1 (46%) | B-C-1 (46%) | Ratio of A to B (Solids) |
|---|---|---|---|---|---|---|---|---|---|---|
| Comparison 1 | | | | | 100 | | | | | 0 |
| Inventive 1-1 | 5.75 | | | | 100 | | | | | 5% |
| Inventive 1-2 | | 6.57 | | | 100 | | | | | 5% |
| Inventive 1-3 | | | 5.75 | | 100 | | | | | 5% |
| Inventive 1-4 | | | | 5.75 | 100 | | | | | 5% |
| Comparison 2 | | | | | | 100 | | | | 0 |
| Inventive 2-1 | 5.75 | | | | | 100 | | | | 5% |
| Inventive 2-2 | | 6.57 | | | | 100 | | | | 5% |
| Inventive 2-3 | | | 5.75 | | | 100 | | | | 5% |
| Inventive 2-4 | | | | 5.75 | | 100 | | | | 5% |
| Comparison 3 | | | | | | | 100 | | | 0 |
| Inventive 3-1 | 5.75 | | | | | | 100 | | | 5% |
| Inventive 3-2 | | 6.57 | | | | | 100 | | | 5% |
| Inventive 3-3 | | | 5.75 | | | | 100 | | | 5% |
| Inventive 3-4 | | | | 5.75 | | | 100 | | | 5% |
| Comparison 4 | | | | | | | | 100 | | 0 |
| Comparison 4-1 | 5.75 | | | | | | | 100 | | 5% |
| Comparison 5 | | | | | | | | | 100 | 0 |
| Comparison 5-1 | 7.18 | | | | | | | | 100 | 5% |
| Inventive 3-3-a** | | | | | | | 100 | | | 5% |

*Value in the bracket ( ) is the solid ratio in the formulation
**The sample is Inventive 3-3, aged in 50° C. oven for 30 days.

TABLE 3

Application Test of Samples.

| | Description | Dry strength (kgf/inch) | Wet strength (kgf/inch) | Δ* | IPA strength (kgf/inch) | Δ* |
|---|---|---|---|---|---|---|
| Comparison 1 | 100% B-I-1 | 6.68 | 2.96 | | 2.23 | |
| Inventive 1-1 | 5% of solids ratio of A1 to B-I-1 | 7.03 | 3.52 | 18.9% | 3.36 | 50.7% |
| Inventive 1-2 | 5% of solids ratio of A2 to B-I-1 | 6.81 | 3.45 | 16.4% | 3.14 | 40.8% |
| Inventive 1-3 | 5% of solids ratio of A3 to B-I-1 | 6.85 | 3.66 | 23.5% | 3.31 | 48.4% |
| Inventive 1-4 | 5% of solids ratio of A4 to B-I-1 | 6.56 | 3.45 | 16.4% | 3.32 | 48.8% |
| Comparison 2 | 100% B-I-2 | 10.95 | 4.32 | | 2.74 | |
| Inventive 2-1 | 5% of solids ratio of A1 to B-I-2 | 10.61 | 4.86 | 12.5% | 4.35 | 58.8% |
| Inventive 2-2 | 5% of solids ratio of A2 to B-I-2 | 11.47 | 4.95 | 14.5% | 4.11 | 50% |
| Inventive 2-3 | 5% of solids ratio of A3 to B-I-2 | 10.62 | 5.08 | 17.8% | 4.35 | 58.8% |
| Inventive 2-4 | 5% of solids ratio of A4 to B-I-2 | 11.05 | 4.8 | 11.2% | 3.98 | 45.2% |
| Comparison 3 | 100% B-I-3 | 8.84 | 3.57 | | 1.90 | |
| Inventive 3-1 | 5% of solids ratio of A1 to B-I-3 | 8.90 | 4.31 | 20.7% | 3.25 | 71.1% |
| Inventive 3-2 | 5% of solids ratio of A2 to B-I-3 | 9.28 | 4.07 | 14% | 3.49 | 83.7% |
| Inventive 3-3 | 5% of solids ratio of A3 to B-I-3 | 8.35 | 4.05 | 13.5% | 3.21 | 68.9% |
| Inventive 3-4 | 5% of solids ratio of A4 to B-I-3 | 8.70 | 4.23 | 18.5% | 3.01 | 58.2% |
| Comparison 4 | 100% B-C-1 | 6.10 | 2.93 | | 1.37 | |
| Comparison 4-1 | 5% of solids ratio of A1 to B-C-1 | 6.41 | 3.14 | 7.2% | 2.21 | 61.3% |
| Comparison 5 | 100% B-C-2 | 5.93 | 2.32 | | 2.36 | |
| Comparison 5-1 | 5% of solids ratio of A1 to B-C-2 | 6.29 | 2.51 | 8.2% | 2.56 | 8.5% |
| Inventive 3-3-a** | Aged in 50° C. oven for 30 days | 8.44 | 4.01 | 12.3% | 3.08 | 62.1% |

*Δ means the improvement of wet/IPA strength with component B in formulation.

Compared to Comparison 1 to 3, Inventive 1-1 to 3-4, with the component A in formulation, showed 10%-25% improvements on wet strength, and 40-90% improvement on IPA strength. By comparing Comparison 1 to Comparison 4 or 5, Inventive 1-1 to Comparison 4-1 or 5-1, both the wet strength and IPA strength were increased when the Component B contained hydroxyl group-containing monomer. Compared Inventive 3-3 to Inventive 3-3-a, it was found that the performances of the inventive formulation kept stable after 30 days, 50° C. heat aging.

Glass Transition Temperature (Tg)

Dry sample of polymer was put into Aluminum crucible, and then the sample was tested by DSC Q2000 from TA Instruments on this program:
1. Rise temperature from −80° C. to 120° C. by 20° C./min to erase thermal history;
2. Cool down to −80° C.;
3. Rise temperature from −80° C. to 120° C. by 10° C./min.

The half height point of transition was decided as glass transition temperature (Tg).

What is claimed is:
1. An adhesive composition, comprising the following components:
(a) a polyacid polymer aqueous dispersion, wherein the polyacid polymer consists of one or more ethylenically unsaturated mono- or dicarboxylic acid/anhydrides;
(b) a hydroxyl group-containing acrylic copolymer emulsion optionally comprising a surfactant, wherein the hydroxyl group-containing acrylic copolymer is obtained from polymerizing a monomer mixture which contains
0.1-10% by weight of hydroxyl group-containing monomer,
0.1% to 20% by weight of unsaturated carboxylic acid,
30%-90% by weight of acrylic monomer, and
optional styrene monomer,
wherein the solid weight ratio of the above components (a) and (b) is 0.1:100 to 10:100, based on the solids of the components (a) and (b); and
(a) and (b) amount to 100 wt % based on the solids of the adhesive composition.

2. The adhesive composition of claim 1, wherein the ethylenically unsaturated mono- or dicarboxylic acid/anhydrides are selected from the group consisting of methacrylic acid, acrylic acid, crotonic acid, fumaric acid, maleic acid, 2-methyl maleic acid, itaconic acid, 2-methyl itaconic acid, α,β-methylene glutaric acid, monoalkyl maleates, monoalkyl fumarates, maleic anhydride, itaconic anhydride, acrylic anhydride, methacrylic anhydride; and salts thereof.

3. The adhesive composition of claim 1, wherein the hydroxyl group-containing monomer includes a hydroxyalkyl (meth)acrylate.

4. The adhesive composition of claim 1, wherein the hydroxyl group-containing monomer is selected from the group consisting of hydroxyethyl methacrylate (HEMA), hydroxyethyl acrylate (HEA), hydroxypropyl methacrylate (HPMA) and hydroxypropyl acrylate.

5. The adhesive composition of claim 1, wherein the unsaturated carboxylic acid comprises (meth)acrylic acid, itaconic acid, fumaric acid, (meth)acrylic anhydride, maleic anhydride, or mixtures thereof.

6. The adhesive composition of claim 1, wherein the acrylic monomer is selected from the group consisting of methyl acrylate, ethyl acrylate, butyl acrylate, glycidyl methacrylate, 2-ethylhexyl acrylate, methyl methacrylate, ethyl methacrylate, butyl methacrylate, 2-ethylhexyl methacrylate, and combinations thereof.

7. The adhesive composition of claim 1, wherein the monomer mixture comprises the styrene monomer.

8. The adhesive composition of claim 1, wherein the polyacid polymer is acrylic acid homopolymer or acrylic acid/maleic anhydride copolymer.

9. The adhesive composition of claim 1, wherein the hydroxyl group-containing acrylic copolymer contains 5-50% by weight of the styrene monomer.

10. The adhesive composition of claim 9, wherein the hydroxyl group-containing acrylic copolymer contains
0.5-2% by weight of the hydroxyl group-containing monomer,
0.1-10% by weight of the unsaturated carboxylic acid,
45%-85% by weight of the acrylic monomer, and
5-13% by weight of the styrene monomer.

11. The adhesive composition of claim 10, wherein
the hydroxyl group-containing monomer is hydroxyethyl methacrylate,
the unsaturated carboxylic acid is itaconic acid and acrylic acid, and
the acrylic monomer is butyl acrylate.

12. The adhesive composition of claim 11, wherein the polyacid polymer is acrylic acid homopolymer or acrylic acid/maleic anhydride copolymer.

13. An article prepared by the adhesive composition according to claim 1.

14. An adhesive composition comprising:
(a) a polyacid polymer consisting of one or more ethylenically unsaturated mono- or dicarboxylic acid/anhydrides;
(b) a hydroxyl group-containing acrylic copolymer comprising
(i) 0.1-10% by weight of hydroxyl group-containing monomer,
(ii) 0.1% to 20% by weight of unsaturated carboxylic acid and
(iii) 30%-90% by weight of acrylic monomer,
(iv) styrene monomer, based on the total weight of the hydroxyl group-containing acrylic copolymer;
(c) optional surfactant,
wherein ratio of the components (a) and (b) is 0.1:100 to 10:100, based on the solid weight of components (a) and (b); and
(a), (b), and (c) amount to 100 wt % of the adhesive composition.

15. The adhesive composition of claim 14, wherein the polyacid polymer is acrylic acid homopolymer or acrylic acid/maleic anhydride copolymer.

16. The adhesive composition of claim 15, wherein the hydroxyl group-containing acrylic copolymer contains
(i) 0.5-2% by weight of the hydroxyl group-containing monomer,
(ii) 0.1-10% by weight of the unsaturated carboxylic acid,
(iii) 45%-85% by weight of the acrylic monomer, and
(iv) 5-13% by weight of the styrene monomer.

17. The adhesive composition of claim 16, wherein the hydroxyl group-containing monomer is hydroxyethyl methacrylate, the unsaturated carboxylic acid is itaconic acid and acrylic acid, and the acrylic monomer is butyl acrylate.

18. The adhesive composition of claim 17, wherein the surfactant is present.

* * * * *